US012614056B2

(12) United States Patent
Guo et al.

(10) Patent No.: US 12,614,056 B2
(45) Date of Patent: Apr. 28, 2026

(54) BUILDING PHOTOVOLTAIC DATA INTERPOLATION METHOD BASED ON WGAN AND WHALE OPTIMIZATION ALGORITHM

(71) Applicant: HUANENG JIANGSU COMPREHENSIVE ENERGY SERVICE CO., LTD., Nanjing (CN)

(72) Inventors: Xi Guo, Nanjing (CN); Lei Cui, Nanjing (CN); Qingwei Cao, Nanjing (CN); Chenhui Niu, Nanjing (CN); Feng Li, Nanjing (CN); Dong Li, Nanjing (CN); Jie Yin, Nanjing (CN); Kenan Cao, Nanjing (CN); Yang Yang, Nanjing (CN)

( * ) Notice: Subject to any disclaimer, the term of this patent is extended or adjusted under 35 U.S.C. 154(b) by 666 days.

(21) Appl. No.: 18/146,346

(22) Filed: Dec. 23, 2022

(65) Prior Publication Data

US 2024/0135138 A1 Apr. 25, 2024

(30) Foreign Application Priority Data

Oct. 11, 2022 (CN) .......................... 202211249097.0

(51) Int. Cl.
*G06N 3/006* (2023.01)
*G06N 3/0464* (2023.01)
*G06N 3/0475* (2023.01)
*G06N 3/048* (2023.01)

(52) U.S. Cl.
CPC .......... *G06N 3/006* (2013.01); *G06N 3/0464* (2023.01); *G06N 3/0475* (2023.01); *G06N 3/048* (2023.01)

(58) Field of Classification Search
None
See application file for complete search history.

*Primary Examiner* — David R Vincent

(57) ABSTRACT

A building photovoltaic data interpolation method based on WGAN and whale optimization algorithm is provided, which includes: obtaining historical building roof photovoltaic output data, perform preprocessing on the historical building roof photovoltaic output data, and uses CNN to build a GAN; describing missing value position of preprocessed data by using a binary mask matrix, and setting Wasserstein distance to define a loss function of a GAN generator and a discriminator; taking the loss function as a fitness function, optimizing an input to the GAN generator through a whale optimization algorithm and obtaining optimized candidate samples; fusing the optimized candidate samples and a photovoltaic data processed by the binary mask matrix to obtain completed reconstructed samples, so as to improve the complementary accuracy, optimize the random noise, remove the unfavorable influencing components, and provide services for building rooftop PV data interpolation more accurately.

8 Claims, 2 Drawing Sheets

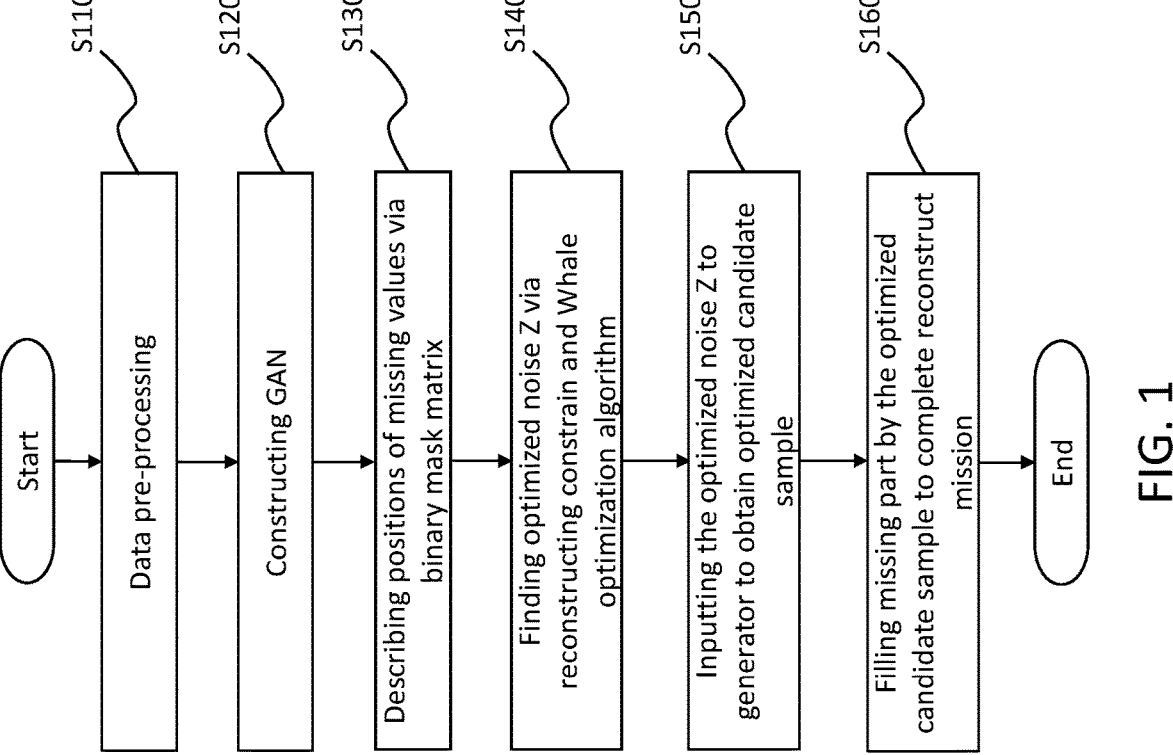

S110

S120

S130

S140

S150

S160

Start

Data pre-processing

Constructing GAN

Describing positions of missing values via binary mask matrix

Finding optimized noise Z via reconstructing constrain and Whale optimization algorithm Inputting the optimized noise Z to generator to obtain optimized candidate sample Filling missing part by the optimized candidate sample to complete reconstruct mission End

FIG. 1

BUILDING PHOTOVOLTAIC DATA INTERPOLATION METHOD BASED ON WGAN AND WHALE OPTIMIZATION ALGORITHM

FIELD OF THE INVENTION

The present invention relates to the technical field of deep learning photovoltaic data interpolation, specifically, building photovoltaic data interpolation method based on Wasserstein Generative Adversarial Networks (WGAN, hereinafter) and Whale optimization algorithm.

BACKGROUND OF THE INVENTION

In recent years, based on the implementation of China's "carbon peak" and "carbon neutrality" policies, new energy-related industries, especially the photovoltaic (PV) industry, have been further developed, and by the end of 2021, China's installed photovoltaic capacity exceeded 300 million kilowatts, and the year-on-year increase is 20.9%. With the large-scale integration of PV equipment into the power grid, the research on PV forecasting and other technologies related to PV grid connection has been intensified.

In the process of PV forecasting, complete and high quality historical PV data is essential. The quality of historical PV data greatly affects the results of PV forecasting and therefore indirectly affects PV grid connection. However, in practice, various factors such as equipment failure, human negligence and climate interference may lead to missing data, which makes the monitored PV data not meet the requirements of PV forecasting. Therefore, the technology related to supplement the missing PV data has significant meaning for large-scale PV grid connection.

SUMMARY OF THE INVENTION

The purpose of this part is to outline some aspects of embodiments of the invention and to briefly introduce some better embodiments. Some simplifications or omissions may be made in this part and in the abstract of the specification and the title of the invention in this application to avoid ambiguity of the purpose of this part, the abstract of the specification and the title of the invention, and such simplifications or omissions shall not be used to limit the scope of the invention.

In view of the above existing problems, the present invention is proposed.

The technical problem solved by the invention is that the existing conventional PV data missing interpolation technology has high calculation complexity, low interpolation accuracy, and low applicability to PV data universality.

For solving the foregoing problems, in accordance to one aspect of the present invention, a building photovoltaic data interpolation method based on WGAN and Whale optimization algorithm is provided. The method includes: obtaining historical building roof photovoltaic output data, performing preprocessing on the historical building roof photovoltaic output data, and using Convolution Neural Network (CNN) to build a Generative Adversarial Network (GAN); describing missing value position of preprocessed data by using a binary mask matrix, and setting Wasserstein distance to define a loss function of a GAN generator and a discriminator; taking the loss function as a fitness function, optimizing an input to the GAN generator through a whale optimization algorithm and obtaining optimized candidate samples; and fusing the optimized candidate samples and a photovoltaic data processed by the binary mask matrix to obtain completed reconstructed samples.

In an embodiment of the method, wherein the historical building roof photovoltaic output data includes a time series with a sampling frequency of 30 min and a time length of one year.

In an embodiment of the method, wherein process of the preprocessing includes: cutting a long time series to separate daily load time series; forming 1*T*n tensor by using the separated daily load time series, where T represents a time step and n represents total number of features; and normalizing the daily load time series.

In an embodiment of the method, wherein constructing the CNN includes: inputting the preprocessed data to a convolution layer for feature extraction; performing a nonlinear mapping on an output of the convolution layer by sigmoid activation function, and mapping input a range between 0 and 1; and inputting the output of the activation function to a pooling layer and performing a dimension reduction processing on feature data.

In an embodiment of the method, wherein constructing GAN includes: calculations of loss of the GAN generator and the discriminator comprises:

$$\min_{G} V(D, G) = E_{G(z) \sim P_f}(-D(G(z)))$$

$$\max_{D} V(D, G) = E_{x \sim P_r}(D(x)) + E_{G(z) \sim P_f}(-D(G(z)))$$

where, G denotes the GAN generator, D denotes the discriminator, V(D,G) denotes degree of difference between generated sample distribution and real sample distribution, E(•) denotes mathematical expectation of distribution function, G(•) denotes generator output, z denotes random noise conforming to normal distribution, $P_f$ denotes the generated sample distribution, D(•) denotes discriminator output, x represents the real samples, $P_r$ denotes the real sample distribution; and converting training process of the GAN into a mathematical model, and calculation of loss function comprises:

$$\min_{G} \max_{D} V(D, G) = E_{x \sim P_r}(D(x)) + E_{G(z) \sim P_f}(-D(G(z))).$$

In an embodiment of the method, wherein constructing the binary mask matrix comprises: the binary mask matrix is composed of 0 and 1, 0 indicates that there is a missing value in corresponding position, and 1 indicates that corresponding position is complete; describing missing positions by performing Hadamard calculation on the constructed binary mask matrix and completed test samples, so as to obtain the samples x' having missing values.

In an embodiment of the method, wherein calculation of loss function of the GAN generator and the discriminator comprises:

$$L_{ossG} = -E_{G(z) \sim P_f}(D(G(z)))$$

$$L_{ossD} = E_{G(z) \sim P_f}(D(G(z))) - E_{x \sim P_r}(D(x)) - kE_{\hat{x} \sim P_u}(\|\nabla_{\hat{x}} D(\hat{x}) \| ^p)$$

where, $L_{ossG}$ denotes generator loss function, $L_{ossD}$ denotes discriminator loss function, k and p denote penalty term parameters, $\hat{x}$ represents a random interpolation of true and false samples, $P_u$ denotes sample distribution of $\hat{x}$.

In an embodiment of the method, wherein the Whale optimization algorithm comprises encircling prey, bubble net attack and searching prey, wherein calculation of encircling prey comprising:

$$\vec{D}=|\vec{C}\vec{X}^*(t)-\vec{X}(t)|$$

$$\vec{X}(t+1)=\vec{X}^*(t)-\vec{A}\cdot\vec{D}$$

where t denotes total number of iterations, $\vec{A}$ and $\vec{D}$ denote coefficient vectors, $\vec{C}$ denotes random vector, $\vec{X}^*$ denotes position vector of optimal solution at current position, and $\vec{X}$ denotes current position of prey, wherein calculation of bubble net attack comprising:

$$\vec{X}(t+1)=\vec{D}^t\cdot e^{bl}\cdot\cos(2\pi l)+\vec{X}^*(t)$$

wherein $\vec{D}^t$ denotes distance between whale and the prey, b denotes a spiral constant, and l denotes a random number in the interval between 0 and 1, wherein calculation of searching prey comprises:

$$\vec{D}=|\vec{C}\cdot\vec{X}_{rand}-\vec{X}|$$

$$\vec{X}(t+1)=\vec{X}_{rand}-\vec{A}\cdot\vec{D}$$

where $\vec{X}_{rand}$ denotes position vector of a head whale in whale population.

In an embodiment of the method, wherein obtaining the optimized candidate samples comprises: defining loss of authenticity of candidate samples and reconstructed samples; defining degree of similarity between the candidate samples and non-missing part of missing value samples by means of Euclidean distance, so as to obtain a total loss; and optimizing the input to the GAN generator by the Whale optimization algorithm to obtain the optimized candidate samples.

In an embodiment of the method, further comprising: performing the Hadamard operation the optimized candidate samples with a value obtained by 1 minus the binary mask matrix to obtain a result, and adding the result to the photovoltaic data processed by the binary mask matrix to obtain the completed reconstructed samples.

Based on the above, the present invention uses GAN to learn the time-series characteristics of historical PV data and the law of change within the time-series for the influencing factors of power load, and uses Whale optimization algorithms to optimize the input noise to implement the optimization of candidate samples. Through the three aspects of processing to the PV load data: data preprocessing, feature learning and algorithm optimization, the provided method can more effectively improve the interpolation accuracy, optimize the random noise, remove the unfavorable influencing components, and more accurately provide services for building roof PV data interpolation.

BRIEF DESCRIPTION OF THE DRAWINGS

Embodiments of the invention are described in more details hereinafter with reference to the drawings, in which:

FIG. 1 is an overall flowchart of a building PV data interpolation method based on WGAN and Whale optimization algorithm provided by an embodiment of the present invention.

DETAILED DESCRIPTION

Figure 2:
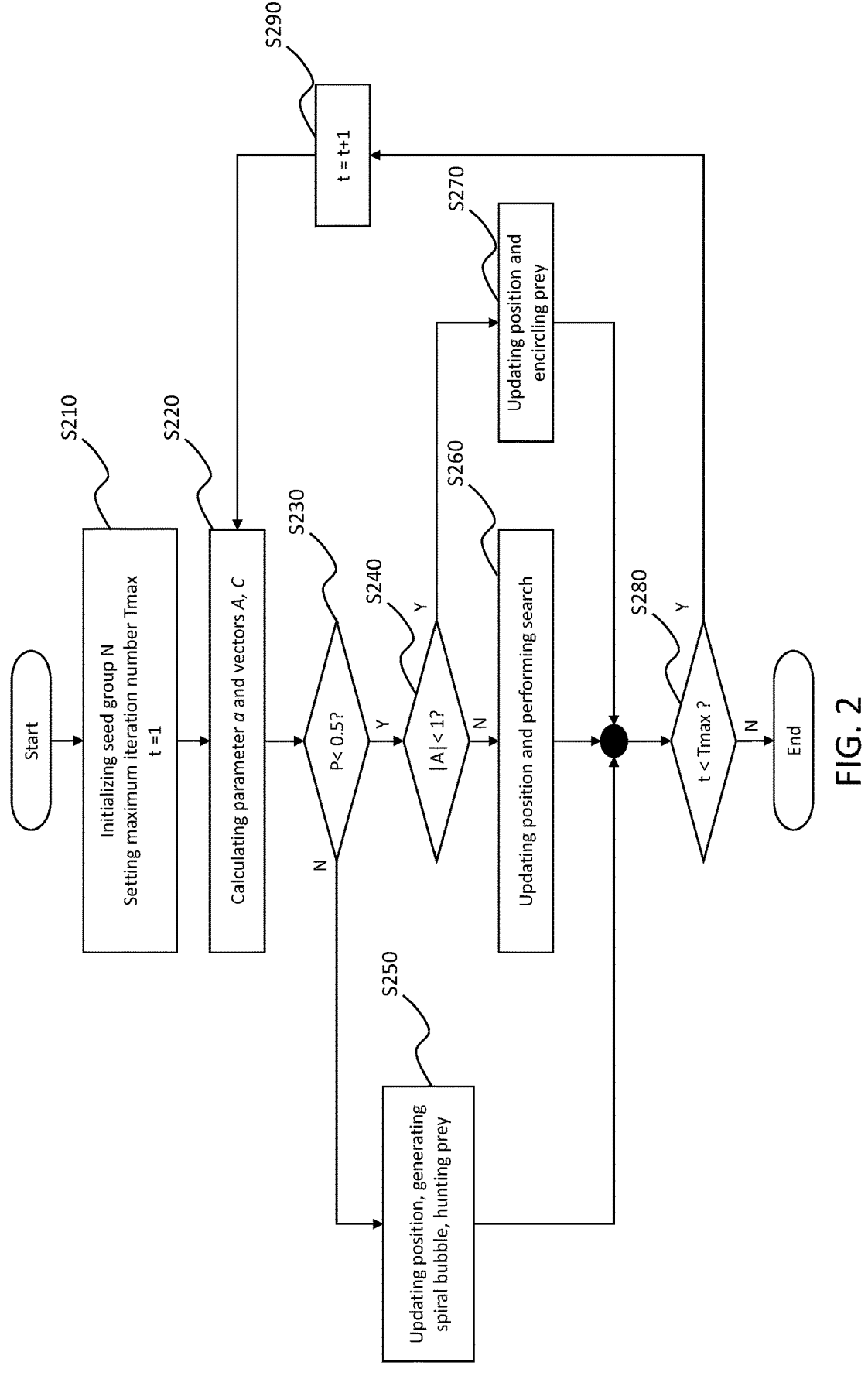
FIG. 2 is a schematic diagram of the optimization process of the whale optimization algorithm in the building PV data interpolation method based on WGAN and Whale optimization algorithm provided by an embodiment of the present invention.

In order to make the above purposes, features and advantages of the invention more obvious and easy to understand, the specific embodiments of the invention are explained in detail in the following with the drawings attached to the specification. Obviously, the embodiments described are part of the embodiments of the invention, but not all of the embodiments. Based on the embodiments of the present invention, all other embodiments obtained by ordinary persons in the field without creative labor shall fall within the scope of the protection of the present invention.

Many specific details are described in the following description in order to fully understand the invention, but the invention can also be implemented in other ways different from those described herein, and persons skilled in the art can do similar promotion without violating the meaning of the invention, so the invention is not limited by the specific embodiment disclosed below.

Secondly, the "one embodiment" or "embodiment" herein refers to a specific feature, structure or feature that can be included in at least one implementation of the invention. The words "in one embodiment" appearing in different places in this specification do not all refer to the same embodiment, nor are they separate or selectively mutually exclusive with other embodiments.

The invention is described in detail in combination with the schematic diagram. When detailing the embodiments of the invention, for the convenience of explanation, the sectional view representing the device structure will not be locally enlarged in general scale, and the schematic diagram is only an example, which should not limit the scope of protection of the invention. In addition, the actual production shall include the three-dimensional space dimensions of length, width and depth.

At the same time, in the description of the invention, it should be noted that the orientation or position relationship indicated by "up, down, inside and outside" in the terminology is based on the orientation or position relationship shown in the drawings, which is only for the convenience of describing the invention and simplifying the description, rather than indicating or implying that the device or element referred to must have a specific orientation, be constructed and operated in a specific orientation, so it cannot be understood as a limitation of the invention. In addition, the term "first, second or third" is used only for descriptive purposes and cannot be understood as indicating or implying relative importance.

Unless otherwise specified and defined in the invention, the term "installation, connection, connection" should be understood in a broad sense, for example, it can be fixed connection, removable connection or integrated connection; It can also be mechanical connection, electrical connection or direct connection, or indirect connection through intermediate media, or internal connection of two components. For ordinary technicians in the art, the specific meaning of the above terms in the invention can be understood in specific cases.

Embodiment 1

Referring to FIGS. 1 to 2 for an embodiment of the present invention, a building PV data interpolation method based on WGAN and Whale optimization algorithm is provided. The method includes steps S1 to S4.

Specifically, S1: obtaining historical building roof photovoltaic output data, performing preprocessing (S110) on the historical building roof photovoltaic output data, and using Convolution Neural Network (CNN) to build a Generative Adversarial Network (GAN) (S120).

It should be mentioned that: the obtained historical building roof photovoltaic output data includes a time series with a sampling frequency of 30 min and a time length of one year.

Furthermore, the process of the preprocessing includes: cutting a long time series to separate daily load time series; forming 1*T*n tensor by using the separated daily load time series, where T represents a time step and n represents total number of features; and normalizing the daily load time series. The calculation for normalizing the daily load time series includes:

$$X_n = \frac{X - X_{min}}{X_{max} - X_{min}}$$

where $X_n$ denotes the normalized data, X denotes the original data in the dataset, $X_{min}$ denotes the minimum value of data in the dataset, and $X_{max}$ denotes the maximum value of data in the dataset.

It should be mentioned that linear normalization method changes the original data linearly and maps the original data to a range between 0 and 1, so as to achieve isometric scaling of the data, such that the processed elemental data for the predicted time period corresponding to the building roof PV equipment can be obtained, and the data is cleaner by pre-processing.

Furthermore, constructing the CNN includes: inputting the preprocessed data to a convolution layer for feature extraction; performing a non-linear mapping on an output of the convolution layer by sigmoid activation function, and mapping input to a range between 0 and 1, wherein the calculation of the sigmoid activation function includes:

$$h(x) = \frac{1}{1 + e^{-x}}$$

where h(x) denotes output of the activation function and x denotes the input to the activation function; and inputting the output of the activation function to a pooling layer and performing a dimension reduction processing on feature data.

It should be clarified that the dimension reduction of the feature data is implemented by dividing the data input to the pooling layer into a number of rectangular regions, and outputting the maximum value for each rectangular region, and by reducing the number of parameters and the amount of computation, so as to implement the dimension reduction.

Moreover, constructing GAN includes:

Calculations of loss of the GAN generator and the discriminator includes:

$$\min_G V(D, G) = E_{G(z) \sim P_f}(-D(G(z)))$$

$$\max_D V(D, G) = E_{x \sim P_r}(D(x)) + E_{G(z) \sim P_f}(-D(G(z)))$$

where, G denotes the GAN generator, D denotes the discriminator, V(D,G) denotes degree of difference between generated sample distribution and real sample distribution, E(•) denotes mathematical expectation of distribution function, G(•) denotes generator output, z denotes random noise conforming to normal distribution, $P_f$ denotes the generated sample distribution, D(•) denotes discriminator output, x represents the real samples, $P_r$ denotes the real sample distribution; and converting training process of the GAN into a mathematical model, and calculation of loss function includes:

$$\min_G \max_D V(D, G) = E_{x \sim P_r}(D(x)) + E_{G(z) \sim P_f}(-D(G(z)))$$

It should be noted that the generator contains 1 fully connected layer, 1 deconvolution layer and 2 convolution layers; the discriminator includes fully connected layers and 3 convolution layers, the input of the generator is the noise z while the output is the generated samples; the input of the discriminator are the generated samples and the real samples while the output is the 1-dimensional discriminator result.

S2: describing missing value position of preprocessed data by using a binary mask matrix (S130), and setting Wasserstein distance to define a loss function of a GAN generator and a discriminator.

It should be noted that the binary mask matrix is composed of 0 and 1, 0 indicates that there is a missing value in corresponding position, and 1 indicates that corresponding position is complete; and describing missing positions by performing Hadamard calculation on the constructed binary mask matrix and completed test samples, so as to obtain the samples x' having missing values.

Furthermore, setting Wasserstein distance to define a loss function of a GAN generator and a discriminator, wherein the calculation of loss function of the GAN generator and the discriminator includes:

$$L_{ossG} = -E_{G(z) \sim P_f}(D(G(z)))$$

$$L_{ossD} = E_{G(z) \sim P_f}(D(G(z))) - E_{x \sim P_r}(D(x)) - kE_{\hat{x} \sim P_u}(\|\nabla_{\hat{x}} D(\hat{x})\|^p)$$

where, $L_{ossG}$ denotes generator loss function, $L_{ossD}$ denotes discriminator loss function, k and p denote penalty term parameters, k and p can be set, for example, 2 and 6. $\hat{x}$ represents a random interpolation of true and false samples, and presented by $\hat{x} = ax + (1-a)G(z)$, $a \in [0,1]$; and $P_u$ denotes sample distribution of $\hat{x}$.

S3: taking the loss function as a fitness function, optimizing an input to the GAN generator through a whale optimization algorithm and obtaining optimized candidate samples (S140 and S150). The Whale optimization algorithm comprises encircling prey, bubble net attack and searching prey.

It should be noted that the whale optimization algorithm simulates the fetching strategy to achieve the optimization purpose, with reference to FIG. 2, the steps of the Whale optimization algorithm include:

The calculation of encircling prey includes (S270):

$$\vec{D} = |\vec{C} \vec{X}^*(t) - \vec{X}(t)|$$

$$\vec{X}(t+1) = \vec{X}^*(t) - \vec{A} \cdot \vec{D}$$

where t denotes total number of iterations, $\vec{A}$ and $\vec{D}$ denote coefficient vectors, $\vec{C}$ denotes random vector, $\vec{X}^*$ denotes position vector of optimal solution at current position, and $\vec{X}$ denotes current position of prey, wherein the calculation of $\vec{A}$ and $\vec{C}$ includes (S210 and S220):

$$\vec{A} = 2\vec{a} \cdot \vec{r_1} - \vec{a}$$

$$\vec{C} = 2 \cdot \vec{r_2}$$

$$\vec{a} = 2 - \frac{2t}{T_{max}}$$

where $\vec{a}$ denotes a coefficient vector, the value of $\vec{a}$ decreases linearly from 2 to 0 gradually, $\vec{r_1}$ and $\vec{r_2}$ denote a random vector in the interval between 0 and 1, and $T_{max}$ denotes the maximum number of iterations.

The calculation of bubble net attack includes (S250):

$$\vec{X}(t+1) = \vec{D}^t \cdot e^{bl} \cdot \cos(2\pi l) + \vec{X}^*(t)$$

wherein $\vec{D}^t$ denotes distance between whale and the prey, b denotes a spiral constant, and l denotes a random number in the interval between 0 and 1.

Assuming a contraction envelope with probability of $p_i$ and a spiral approach with probability of $1-p_i$, where $p_i$ is set to 0.5, the calculation of the optimal solution for the position vector includes (S230, S240, S250 and S270):

$$\vec{X}(t+1) = \begin{cases} \vec{X}^*(t) - \vec{A} \cdot \vec{D}, & p < Pi \\ \vec{D}^t \cdot e^{bl} \cdot \cos(2\pi l) + X^*(t), & p \geq Pi \end{cases}$$

Calculation of searching prey includes (S260, S280 and S290):

$$\vec{D} = |\vec{C} \cdot \vec{X}_{rand} - \vec{X}|$$

$$\vec{X}(t+1) = \vec{X}_{rand} - \vec{A} \cdot \vec{D}$$

where $\vec{X}_{rand}$ denotes position vector of the head of whale population.

Furthermore, obtaining the optimized candidate samples includes: defining loss of authenticity of candidate samples and reconstructed samples, and the related equations are presented below:

$$L_1 = D(G(z))$$

$$Y = x' + (1-M) \odot G(z)$$

$$L_2 = D(Y)$$

where $L_1$ denotes candidate sample authenticity loss; G(z) denotes reconstructed candidate sample; Y denotes the reconstructed sample obtained by using the candidate sample to supplement with missing values; x' denotes the sample, processed by the binary mask matrix, having the missing values; M denotes the binary mask matrix; and $L_2$ denotes reconstructed sample authenticity loss.

Then, defining degree of similarity between the candidate samples and non-missing part of missing value samples by means of Euclidean distance, so as to obtain a total loss, wherein the calculation of the total loss includes:

$$L_s = \|x', M \odot G(z)\|_2$$

$$L_{total} = L_s + \lambda_1 L_1 + \lambda_2 L_2$$

where $L_s$ denotes the loss used to measure the degree of similarity between the candidate sample and the non-missing part of the missing value sample, $\|-\|_2$ denotes the Euclidean distance taken, $L_{total}$ denotes a defined total loss, $\lambda_1$ denotes a custom parameter used to balance $L_1$, and $\lambda_2$ denotes a custom parameter used to balance $L_2$.

Then, optimizing the input to the GAN generator and obtaining the optimized candidate sample G'(z) by the Whale optimization algorithm, so as to obtain the optimized reconstructed sample Y'=x'+(1−M)⊙G'(z).

S4: fusing the optimized candidate samples and a photovoltaic data processed by the binary mask matrix to obtain completed reconstructed samples (S160).

Specifically, performing the Hadamard operation the optimized candidate samples with a value obtained by 1 minus the binary mask matrix to obtain a result, and adding the result to the photovoltaic data processed by the binary mask matrix to obtain the completed reconstructed samples.

Based on above, the present invention uses GAN to learn the time-series characteristics of historical PV data and the law of change within the time-series for the influencing factors of power load, and uses Whale optimization algorithms to optimize the input noise to implement the optimization of candidate samples. Through the three aspects of processing to the PV load data: data preprocessing, feature learning and algorithm optimization, the provided method can more effectively improve the interpolation accuracy, optimize the random noise, remove the unfavorable influencing components, and more accurately provide services for building roof PV data interpolation.

Embodiment 2

This embodiment 2 differs from the embodiment 1 in that it provides a validation test of the building PV data interpolation method based on WGAN and the Whale optimization algorithm. In order to validate and illustrate the technical effects employed in this method, this embodiment 2 uses a conventional technical solution to conduct a comparison test with the method of the present invention to compare the test results by means of scientific argumentation in order to verify the real effects that this method has.

The short-term power prediction/forecast of building rooftop PV in Jiangning district of Nanjing is selected, it contains 365 days of data from three users' rooftops, taking 30 min as a sampling interval, containing 48 data points per day. According to the actual data set selected, the input sequence is 1*48*4 PV power output with a sampling frequency of 30 min from 0:00-23:59, where 1 is the number of channels, 48 is the time step, and 4 is the number of features.

Table 1 below shows the schematic diagram of the performance comparison between the building PV data interpolation method based on WGAN and Whale optimization algorithm and the traditional PSO particle swarm algorithm interpolation. It can be seen that the predicted values tested by the method provided by the present invention are closer to the real values of the short-term power of building roof PV and can achieve the purpose of accurate prediction.

TABLE 1

| | | Root mean square error | Mean absolute error | Goodness of fit |
|---|---|---|---|---|
| User | Interpolation method | | | |
| User #1 rooftop equipment | PSO | 0.45 | 0.18 | 0.9140 |
| | Whale optimization (the invention) | 0.38 | 0.17 | 0.9771 |
| User #2 rooftop equipment | PSO | 0.32 | 0.21 | 0.8931 |
| | Whale optimization (the invention) | 0.29 | 0.18 | 0.9510 |
| User #3 rooftop equipment | PSO | 0.61 | 0.41 | 0.8711 |
| | Whale optimization (the invention ) | 0.52 | 0.37 | 0.9115 |

From Table 1, it can see that the hybrid model of WGAN+ whale optimization algorithm proposed in this invention has excellent performance in three evaluation indexes: Root mean square error, Mean absolute error and Goodness of fit, and it indicates that the interpolation results of the building PV data interpolation method based on WGAN and Whale optimization algorithm are more accurate and have lower computational complexity It should be noted that the above embodiments are only used to illustrate the technical solution of the invention rather than limit it. Although the invention has been described in detail with reference to better embodiments, ordinary technicians in the art should understand that the technical solution of the invention can be modified or replaced equivalently without departing from the spirit and scope of the technical solution of the invention, which should be covered in the scope of claims of the invention.

What is claimed is:

1. A data completion method for improving operational efficiency and reliability of a building photovoltaic generation system, characterized by utilizing a hybrid model based on a Wasserstein Generative Adversarial Network (WGAN) and a Whale Optimization Algorithm (WOA) to achieve completion of missing historical roof photovoltaic output data, the method comprising:

obtaining historical building roof photovoltaic output data with a sampling frequency of 30 minutes over a one-year duration, and subjecting the data to preprocessing including cutting a long time series to separate daily load time series; forming 1*T*n tensor by using the separated daily load time series, where T represents a time step and n represents total number of features; and normalizing the daily load time series;

constructing a Generative Adversarial Network (GAN) using a Convolutional Neural Network (CNN), wherein a generator G and a discriminator D learn a true distribution of the data through adversarial training, and utilizing a binary mask matrix to describe missing value locations of the data to guide the WGAN in generating missing data;

optimizing input noise of the GAN generator by a Whale Optimization Algorithm (WOA), wherein Wasserstein distance is set to define a loss function of the generator G and the discriminator D, the WOA utilizes a total loss function comprising components from the generator G, discriminator D, and reconstruction losses as a fitness function, and performs the WOA to obtain optimized input noise capable of enabling the GAN to generate realistic and consistent reconstructed samples:

the WOA comprises encircling prey, bubble net attack and searching prey, wherein calculation of encircling prey comprising:

$$\vec{D} = |\vec{C}\vec{X}^*(t) - \vec{X}(t)|$$
$$\vec{X}(t+1) = \vec{X}^*(t) - \vec{A} \cdot \vec{D}$$

where t denotes total number of iterations, $\vec{A}$ and $\vec{D}$ denote coefficient vectors, $\vec{C}$ denotes random vector, $\vec{x}^*$ denotes position vector of optimal solution at current position, and $\vec{X}$ denotes current position of prey, wherein calculation of bubble net attack comprising:

$$\vec{X}(t+1)=\vec{D}^t \cdot e^{bl} \cdot \cos(2\pi l)+\vec{X}^*(t)$$

wherein $\vec{D}^t$ denotes distance between whale and the prey, b denotes a spiral constant, and l denotes a random number in the interval between 0 and 1, wherein calculation of searching prey comprises:

$$\vec{D}=|\vec{C} \cdot \vec{X}_{rand} - \vec{X}|$$
$$\vec{X}(t+1)=\vec{X}_{rand} - \vec{A} \cdot \vec{D}$$

where $\vec{X}_{rand}$ denotes position vector of a head whale in whale population;

inputting optimal input noise determined by the WOA to the generator G to generate highly realistic reconstructed photovoltaic output data; and applying the reconstructed photovoltaic output data to an operational management of the building photovoltaic power generation system.

2. The data completion method of claim 1, wherein constructing the CNN comprises:

inputting the preprocessed data to a convolution layer for feature extraction;

performing a non-linear mapping on an output of the convolution layer by sigmoid activation function, and mapping input to a range between 0 and 1; and inputting the output of the activation function to a pooling layer and performing a dimension reduction processing on feature data.

3. The data completion method of claim 1, wherein constructing GAN comprises:

calculations of loss of the generator G and the discriminator D comprises:

$$\min_G V(D, G) = E_{G(z) \sim P_f}(-D(G(z)))$$

$$\max_D V(D, G) = E_{x \sim P_r}(D(x)) + E_{G(z) \sim P_f}(-D(G(z)))$$

where, G denotes the GAN generator, D denotes the discriminator, V(D,G) denotes degree of difference between generated sample distribution and real sample distribution, E(•) denotes mathematical expectation of distribution function, G(•) denotes generator output, z denotes random noise conforming to normal distribution, $P_f$ denotes the generated sample distribution, D(•) denotes discriminator output, x represents real samples, $P_r$ denotes the real sample distribution; and converting training process of the GAN into a mathematical model, and calculation of loss function comprises:

$$\min_{G}\max_{D} V(D, G) = E_{x \sim P_r}(D(x)) + E_{G(z) \sim P_f}(-D(G(z))).$$

4. The data completion method of claim 3, wherein constructing the binary mask matrix comprises:

the binary mask matrix is composed of 0 and 1, 0 indicates that there is a missing value in corresponding position, and 1 indicates that corresponding position is complete; and describing missing positions by performing Hadamard calculation on the constructed binary mask matrix and completed test samples, so as to obtain the samples x' having missing values.

5. The data completion method of claim 4, wherein calculation of loss function of the GAN generator and the discriminator comprises:

$$L_{ossG} = -E_{G(z) \sim P_f}(D(G(z)))$$

$$L_{ossD} = E_{G(z) \sim P_f}(D(G(z))) - E_{x \sim P_r}(D(x)) - kE_{\hat{x} \sim P_u}(\|\nabla_{\hat{x}} D(\hat{x})\|^p)$$

where, $L_{ossG}$ denotes generator loss function, $L_{ossD}$ denotes discriminator loss function, k and p denote penalty term parameters, $\hat{x}$ represents a random interpolation of true and false samples, $P_u$ denotes sample distribution of $\hat{x}$.

6. The data completion method of claim 5, wherein obtaining optimized candidate samples comprises:

defining loss of authenticity of candidate samples and reconstructed samples;

defining degree of similarity between the candidate samples and non-missing part of missing value samples by means of Euclidean distance, so as to obtain a total loss; and optimizing the input to the GAN generator by the Whale optimization algorithm to obtain the optimized candidate samples.

7. The data completion method of claim 6, further comprising:

performing the Hadamard operation the optimized candidate samples with a value obtained by 1 minus the binary mask matrix to obtain a result, and adding the result to the photovoltaic data processed by the binary mask matrix to obtain the completed reconstructed samples.

8. The data completion method of claim 2, wherein constructing GAN comprises:

calculations of loss of the generator G and the discriminator D comprises:

$$\min_{G} V(D, G) = E_{G(z) \sim P_f}(-D(G(z)))$$

$$\max_{D} V(D, G) = E_{x \sim P_r}(D(x)) + E_{G(z) \sim P_f}(-D(G(z)))$$

where, G represents the GAN generator, D represents the discriminator, V(D, G) represents degree of difference between generated sample distribution and real sample distribution, E(•) represents mathematical expectation of distribution function, G(•) represents generator output, z represents random noise conforming to normal distribution, $P_f$ represents the generated sample distribution, D(•) represents discriminator output, x represents the real samples, $P_r$ represents the real sample distribution; and converting training process of the GAN into a mathematical model, and calculation of loss function comprises:

$$\min_{G}\max_{D} V(D, G) = E_{x \sim P_r}(D(x)) + E_{G(z) \sim P_f}(-D(G(z))).$$

* * * * *